R. J. DEWHURST.
SCREW BOLT FOR FASTENING RAILROAD CHAIRS.
No. 48,531. Patented July 4, 1865.
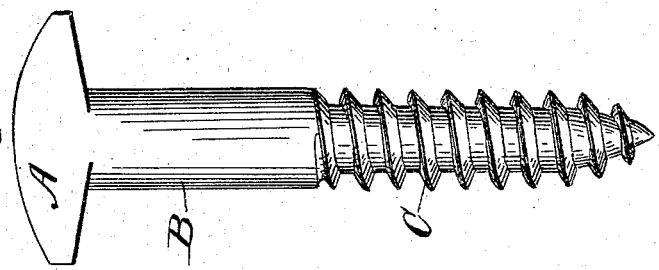
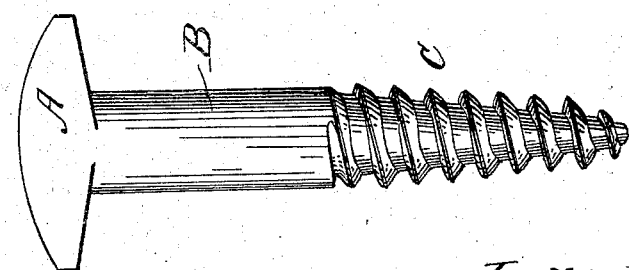
Witnesses
Andrew H. Todd
John Cochrane
Inventor
Richard J. Dewhurst

UNITED STATES PATENT OFFICE.

RICHD. JAMES DEWHURST, OF NEW YORK, N. Y.

SCREW-BOLT FOR FASTENING RAILROAD-CHAIRS.

Specification of Letters Patent No. 48,531, dated July 4, 1865.

*To all whom it may concern:*

Be it known that I, RICHARD JAMES DEWHURST, of the city and county of New York and State of New York, have invented a new and improved screw-bolt for fastening railroad-chairs to the cross-ties and for other purposes where the screw is intended to enter and hold in wood; and I do hereby declare that the following is a full and exact description thereof, reference being had to the accompanying drawings, Figures 1 and 2, in both of which—

A is the head of the bolt, here shown of the T form as now generally used for putting down railroad bars and chairs, but it may be polygonal or of any other form desired.

B is the shank of the bolt of round bar iron, and c the screw, which may have any desired form of thread but the serrated form here shown is considered the best adapted for holding in timber. This screw may be made tapering as shown in Fig. 1, or spindle form or cylindrical and gimlet pointed as shown in Fig. 2.

My invention consists in producing such bolts complete and fit for use by forging the screw thread thereon while hot, by a peculiar mode which I have devised for that purpose and by which a rotative and longitudinal movement being imparted to the bolt, the thread or screw is gradually formed and finished, commencing at the point of the bolt and progressing onward to the required extent: the displaced metal from between the threads being worked into the screw part of the bolt as the operation progresses, thereby increasing that part of the bolt lengthwise and preserving a constant and unbroken relationship between the body or central part of the bolt and its surrounding thread.

The advantages possessed by this description of screw bolt over those of usual make consist in its greater strength for a given size of iron, its greater capacity for holding in timber, and the comparative cheapness of its production. The screw thread in these bolts being produced by forging, the material usually turned off from the bar to form the thread is entirely economized, being worked into the screw part of the bolt, which saving, in a bolt of the size shown in the drawings, forms about eighteen per cent. of the whole weight. In relation to the matter of strength, it is well known that the interior portion of a bar of round rolled iron is not as solid or as strong as the exterior portion of such bar, which exterior portion of the bar is usually turned off and wasted, as before observed when the thread is formed by chasing, thus leaving for the body of the screw a portion of the bar which is of inferior strength. In a three quarter inch bolt, as shown in the cylindrical part of C, in Fig. 2, a thread of proper size to hold efficiently in timber should be cut in to the depth of one eighth of an inch, leaving the central portion half an inch in diameter. The area of the cross section of the bar is thus reduced from .4,417 to .1,963 of a square inch, showing that five-ninths of the original substance of the bar has been turned off and wasted in forming the thread, but as before stated, the interior portion thus left to form the body of the screw is of comparatively less strength than the exterior portion which was cut away in forming the thread, and although such central portion forms the four ninths of the substance of the bar its strength is not more, in the average run of bar iron, than one third the original strength of such bar: when however, such screw thread is formed by forging, as described, the interior portion becomes consolidated and so strengthened by the operation as to be equal in ordinary bar iron to about one half the strength of such bar; from which it is manifest that forged screws of a given size of iron are much stronger than chased screws of the same size of iron, thereby enabling such bolts to more efficiently resist the torsion to which they are unavoidably subjected in penetrating timber.

The tapering form of screw shown in the drawing at Fig. 1, has also a material advantage over the screw of uniform diameter by reason of the greater hold it takes in the timber, as I have experimentally ascertained, having placed a chased screw of uniform diameter and a forged screw of tapering form, side by side in the same piece of timber; both the said screws being made from the same size of iron and with the same size and form of thread, and the holes for both in the timber, were bored with the same auger; the screw of uniform diameter was drawn out by a force of sixty one hundred and sixty five pounds, while the tapering screw required ninety seven hundred and five pounds to draw it out, showing a difference in holding capacity of over fifty seven per cent. in favor of the taper screw bolt.

Having thus described my improved screw bolt, what I claim as my invention, and desire to recure by Letters Patent is—

The bolt with the screw part thereof formed substantially as described and by the mode or process substantially as described, as a new article of manufacture.

RICHARD J. DEWHURST.

Witnesses:
 ANDREW I. TODD,
 JOHN COCHRANE.